US006305942B1

(12) United States Patent
Block et al.

(10) Patent No.: US 6,305,942 B1
(45) Date of Patent: Oct. 23, 2001

(54) METHOD AND APPARATUS FOR INCREASED LANGUAGE FLUENCY THROUGH INTERACTIVE COMPREHENSION, RECOGNITION AND GENERATION OF SOUNDS, WORDS AND SENTENCES

(75) Inventors: Robert S. Block, Marina Del Rey; Robert D. Loye; Margot Swan, both of Tujunga, all of CA (US)

(73) Assignee: MetaLearning Systems, Inc., Tujunga, CA (US)

(*) Notice: Subject to any disclaimer, the term of this patent is extended or adjusted under 35 U.S.C. 154(b) by 0 days.

(21) Appl. No.: 09/189,809

(22) Filed: Nov. 12, 1998

(51) Int. Cl.[7] .......................... G09B 19/00; G09B 19/06; G09B 19/08; G09B 1/00; G09B 5/00
(52) U.S. Cl. .......................... 434/156; 434/157; 434/167; 434/169; 434/170; 434/178; 434/185
(58) Field of Search .................................... 434/156, 157, 434/167, 169, 170, 178, 185, 307 R, 307 A, 308

(56) References Cited

U.S. PATENT DOCUMENTS

| 4,354,842 | 10/1982 | Stoddard et al. | 434/195 |
| 5,218,537 | 6/1993 | Hemphill et al. | 364/419 |
| 5,286,205 | 2/1994 | Inouye et al. | 434/157 |
| 5,328,373 | 7/1994 | Wood | 434/172 |
| 5,338,201 | 8/1994 | Levine | 434/178 |
| 5,344,326 | 9/1994 | Ferris | 434/336 |
| 5,421,731 | 6/1995 | Walker | 434/167 |
| 5,451,163 | 9/1995 | Black | 434/178 |
| 5,458,338 | 10/1995 | Beardsley | 273/269 |
| 5,486,111 | 1/1996 | Watkins | 434/157 |
| 5,487,671 | 1/1996 | Shpiro | 434/185 |
| 5,567,159 | 10/1996 | Tehan | 434/178 |
| 5,618,180 | 4/1997 | Nathanson | 434/156 |
| 5,649,826 | 7/1997 | West et al. | 434/157 |
| 5,799,267 | * 8/1998 | Siegel | 704/1 |
| 6,068,487 | * 5/2000 | Dionne | 434/178 |

* cited by examiner

Primary Examiner—John Edmund Rovnak
(74) Attorney, Agent, or Firm—Burns, Doane, Swecker & Mathis, L.L.P.

(57) ABSTRACT

The present invention provides a comprehensive English language learning system and methodology. An interactive procedure for learning English is provided that can be applied in both public and private schools and in adult education programs. It can be used, for example, to teach primary English, to teach English as a second language (ESL) and to improve the language skill of remedial and educationally handicapped students.

20 Claims, 9 Drawing Sheets

METHOD AND APPARATUS FOR INCREASED LANGUAGE FLUENCY THROUGH INTERACTIVE COMPREHENSION, RECOGNITION AND GENERATION OF SOUNDS, WORDS AND SENTENCES

BACKGROUND OF THE INVENTION

1. Field of the Invention

The present invention generally relates to an interactive system and method for increased comprehension, expression and recognition of English and other languages through representation and generation of sounds and words.

2. State of the Art

Fluency is defined as the ability to understand the ideas and views of others, spoken and written, and the ability to communicate ideas and views through speech and writing. There is a difference between simple recognition of words and the ability to read, write, listen, speak and think in a language. When people are fluent in a language, they begin to read to learn instead of learning to read. This is a large advantage to the person and society.

The Biblical story of the "Tower of Babel" teaches that to understand one another people must communicate with each other, that communication is a prerequisite to cooperation, and that cooperation is an essential characteristic of a healthy and successful society. Only by communicating can people share experiences, teach and learn from one another, dispel fear of the unknown and improve their lives and their society.

It should be understood, however, that the need for a shared language is not a call for one language, or for one culture. Maintaining ethnic, racial and cultural diversity is important for a healthy, vibrant, successful world. For example, diversity has helped to build America and is as important to its future as it was to its past. However, diversity must not doom Americans to live in a Tower of Babel, unable to communicate and cooperate.

In the United States, the common shared language is English. It is important that all Americans read, write, listen, speak and think in English. Just as a musician's instrument must be tuned for the music to be enjoyed, a thought must be expressed correctly for it to be understood. The English language is also used throughout the world in a wide range of areas such as science, technology, medicine, finance, diplomacy and world trade. People with good English skills have a large advantage over people without such skills: they get a better education, better jobs, make more money and live better lives. Literate people can learn math, history science and other subjects that illiterate people find daunting, if not impossible. Additionally, both attitude and self-confidence improve when a person becomes fluent in a language.

In the United States, low student test scores in English Language Arts makes it evident that there is a need for an effective English Language Arts Program for kindergarten through fourth grade, remedial and educationally handicapped students and for students whose native language is other than English.

In the past, there have several attempts to provide methods and systems to better a person's command of an unknown language. For example, U.S. Pat. No. 5,218,537, U.S. Pat. No. 4,354,842, U.S. Pat. No. 5,649,826, U.S. Pat. No. 5,618,180, U.S. Pat. No. 5,567,159, U.S. Pat. No. 5,487,671, U.S. Pat. No. 5,486,111, U.S. Pat. No. 5,458,338 U.S. Pat. No. 5,451,163, U.S. Pat. No. 5,421,731, U.S. Pat. No. 5,344,326, U.S. Pat. No. 5,338,201, U.S. Pat. No. 5,328,373, U.S. Pat. No. 5,286,205 all describe ways of teaching different languages. However, none of these patents are directed to a system for increased language comprehension through interactive representation, generation and recognition of sounds, words and sentences.

SUMMARY OF THE INVENTION

The present invention provides a comprehensive English language learning system and methodology. An interactive procedure for learning English is provided that can be applied in both public and private schools as well as home study and in adult education programs. It can be used, for example, to teach primary English, to teach English as a second language (ESL) and to improve language skills of remedial educationally handicapped students.

In an exemplary embodiment of the present invention, a system for representing, generating and recognizing sounds is provided which comprises at least one means for presenting a plurality of sounds, each of said sounds being visually represented by text, and at least one sound generating means for audibly producing the sound corresponding to said visually represented sound, wherein each sound is depicted visually using a highlighting cursor.

Another exemplary embodiment of the present invention provides a system for representing, generating and recognizing words. The system comprises: at least one means for presenting words, wherein each of said words further comprises at least one sound, each of said sounds being visually represented, and at least one word generating means for audibly producing the sounds corresponding to said visually represented word, wherein each sound of said word is depicted visually using a highlighting cursor.

In yet another exemplary embodiment of the present invention a method for increasing language comprehension is disclosed which comprises: displaying at least one sound to be viewed; highlighting said sound; displaying said at least one sound within a word while presenting an associated picture described by said word; and highlighting sound within said word.

BRIEF DESCRIPTION OF THE DRAWINGS

Other objects and advantages of the present invention will become more apparent from the following detailed description of preferred embodiments, when read in conjunction with the accompanying drawings wherein like elements have been represented by like reference numerals and wherein.

DETAILED DESCRIPTION OF THE PREFERRED EMBODIMENTS

Figure 1:
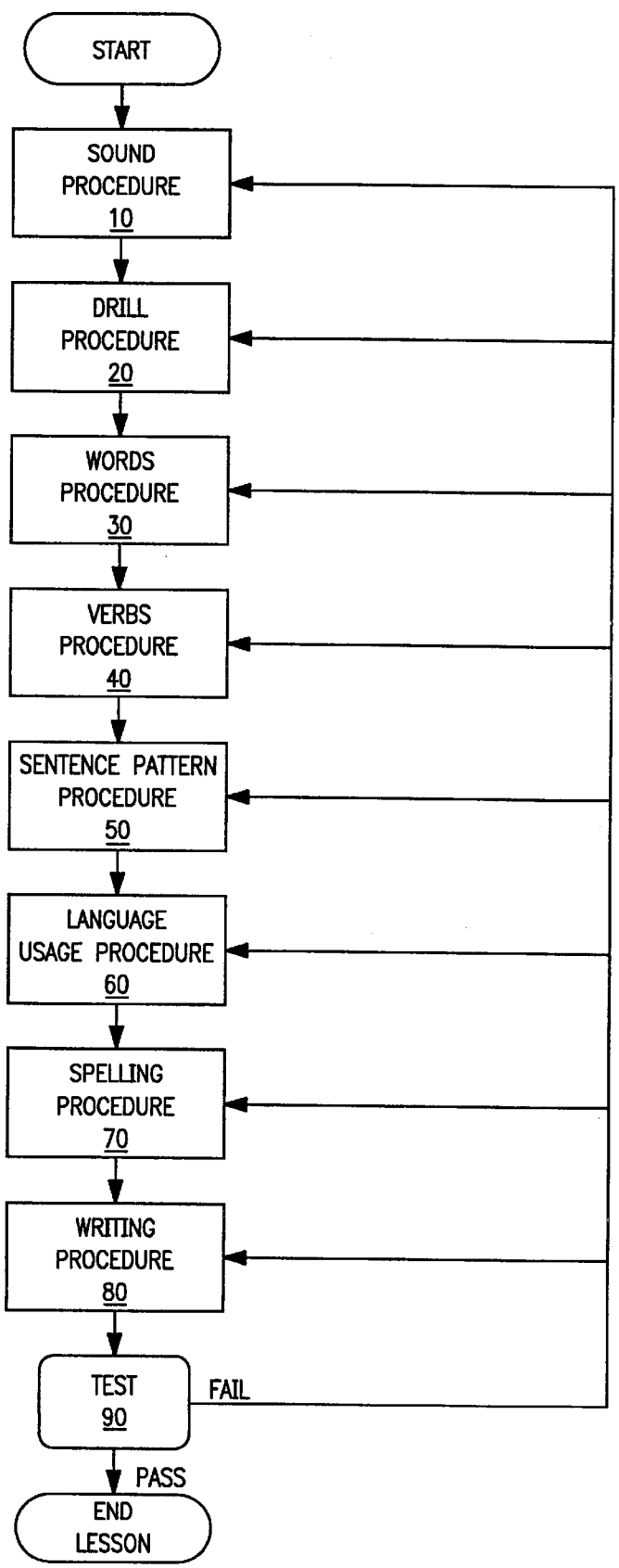
FIG. 1 illustrates a flow diagram of a lesson in accordance with an exemplary embodiment of the present invention.

Each individual lesson of an exemplary interactive language comprehension program in accordance with the present invention, as shown in FIG. 1, moves naturally from sounds, to letters, to syllables, to words, to phrases, to sentences, to paragraphs, and to whole stories. Each lesson comprises a variety of procedures illustrated in FIG. 1. The procedures help to establish a consistency and continuity which enables students to concentrate on the content of an activity rather than being preoccupied with the mechanics of the activity itself.

The lessons can take place within a classroom where a teacher provides the necessary direction and instruction for successful completion of a lesson. Within the classroom, a video tape can be placed into a video playback machine and played for the class. Workbooks can be distributed to each class member for purposes of performing writing exercises. Additionally, the classroom edition of the program includes a Teacher's Guide, Daily Practice and Homework Worksheets, wall charts and other support material.

If a teacher is unavailable or the program is used in a home study program, the video can be viewed by a student to provide instruction with the addition of audio tapes to take the place of the instructor in the classroom. In addition to a video presentation, the lessons can also be performed by interaction with a computer that has been programmed to provide lessons in accordance with the present invention. Workbooks are also available for the user of the interactive computer for the purpose of performing writing exercises. Each workbook contains exercises along with pictures and illustrations to help the student supplement the teachings of the teacher, video or computer program. The interactive language comprehension computer program contains several subprograms in addition to the main program for performing the procedure to be discussed.

In step 10 of the lesson process illustrated in FIG. 1, students are taught the sounds used in spoken English (or other languages) and shown what each sound looks like when it is written. The English language has 26 letters, 46 most used sounds and 103 common ways to spell those sounds. The same letter or spelling can have different sounds. The sequence in which the sounds of the English language are taught is important. In accordance with an exemplary embodiment of the present invention, the vowel sounds a, e, i, o, and u, are taught first because they are the most prevalent in the English language. Most words in the English language have more vowel sounds than any other sound.

The letter "a," for example, can be pronounced like the "a" in acorn, all or at. In each of those words, the letter "a" is pronounced differently. Some sounds are spelled only one way while other sounds can be spelled up to eight ways. The "a" sound in the word acorn, can be spelled six ways: "a," (as in acorn) "a–e," (as in ate) "ai," (as in paid) "ay," (as in say) "ey," (as in they) "eigh" (as in eight), "ei" (as in veil) and "ea" (as in great).

Immediately after teaching the vowel sounds, the consonant sounds that produce the largest number of words are taught followed by those which appear in fewer words as they progress through the sounds. Each lesson teaches one or more of the basic sounds of the English language. Each lesson can use the sounds and spellings from previous lessons to continuously reinforce what has been learned while teaching new sounds to students. A sound may appear at the beginning of the word, somewhere in the middle, or at the end. In any case, all spellings of the same sound are taught as a group. The program in accordance with an exemplary embodiment of the invention teaches all the sounds, all the spellings, and all the positions in a word in integrated lessons.

Students need to know and learn the different ways to spell the same sound and the different sounds for the same spelling. Sounds and their spelling are the basic building blocks of the English language as they link reading and writing to speaking and listening. Instead of learning spelling rules, which are hard to remember, the present invention allows students learn the basic structure of the language. As such, both pronouncing and spelling words correctly are learned by the student simultaneously.

Figure 2A:
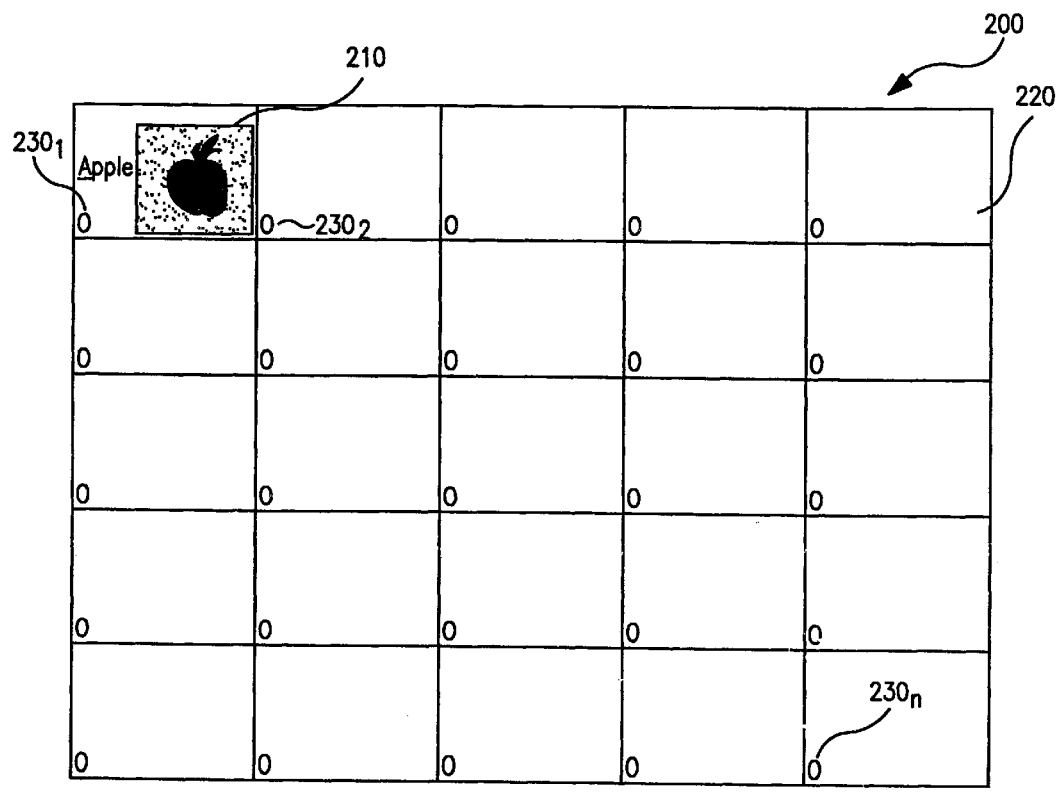
FIGS. 2A and 2B illustrate an exemplary wall chart in accordance with the present invention.
Figure 2B:
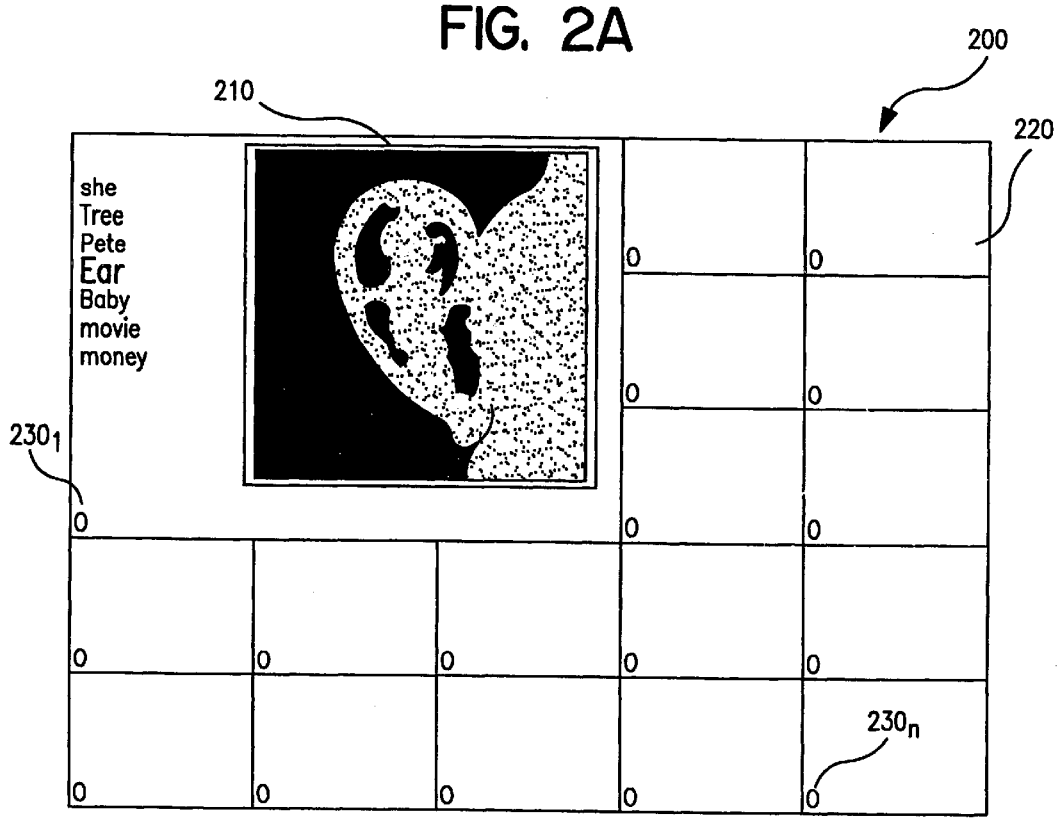

When the sound procedure 10 is taught in a classroom environment, a wall chart can be employed to assist students in language comprehension. The wall chart can contain rules, definitions, illustrations and examples to be referred to during the course. As shown in FIGS. 2A and 2B, a wall chart 200 is segmented into a plurality of activity squares 220. Within each activity square 220 is a picture 210 that corresponds to a word that is also shown in the activity square. Within each word is the sound that is being taught. For example, as shown in FIG. 2A, a picture 210 of an apple illustrated. Next to the picture, a spelling of the word apple is provided. The sound that is being stressed, "a", is underlined. In addition, the sound being stressed can also be shown in different colors, such as red or even bolded compared to the other letters of the word. Each word may or may not be capitalized. In addition to the spelling of a word, the spelling of the sound being taught within the word can also be shown next to the displayed word. For example, in FIG. 2B the sound "ee" can be illustrated next to the word "tree" (assuming the sound "ee" is being taught within the activity square). As shown in FIG. 2B an ear is illustrated. However, multiple words having the sound "e" are also provided showing the different spellings of that sound. The word corresponding to the picture is larger than the other words provided. As described above with respect to FIG. 2A, the sound being taught can be underlined, shown in different colors and bolded.

Figure 2C:
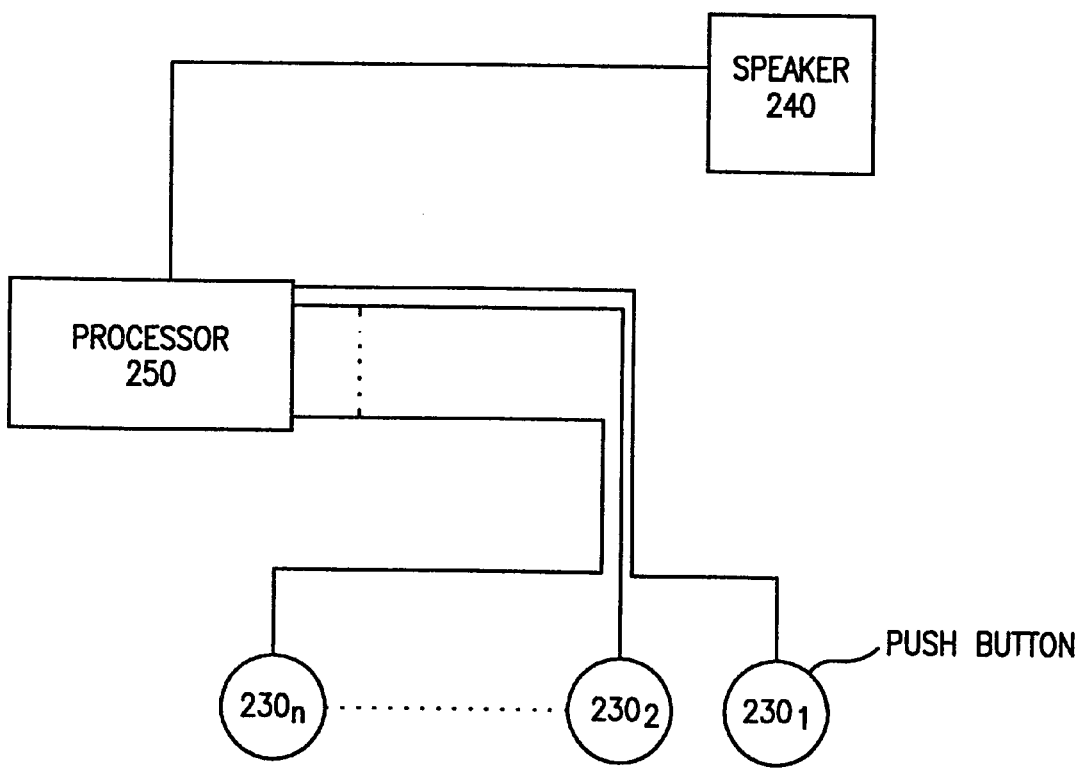
FIG. 2C illustrates a block diagram of the sound processing system of the wall chart in accordance with the present invention.

To provide more reinforcement of the sounds push buttons $230_1$, . . . $230_n$, or other switches can be located within each activity square 220 of the wall chart. As illustrated in FIG. 2C, a speaker 240 can be attached to the wall chart when a push button is activated a processor 250 powered by a power supply (not shown) can play back the sounds and spelling of words which correspond to words on the wall chart.

Another aid to in-class teaching is the use of a smaller book or folder using the same technique as the wall chart so that individual students can keep them at their desk or use them in a game. In addition, the workbook that is handed out to individual students in class can have a sound generation system similar to the FIG. 2C sound system which allows the student to manually depress a pushbutton corresponding to a sound and hear the sound, while practicing.

Figure 3:
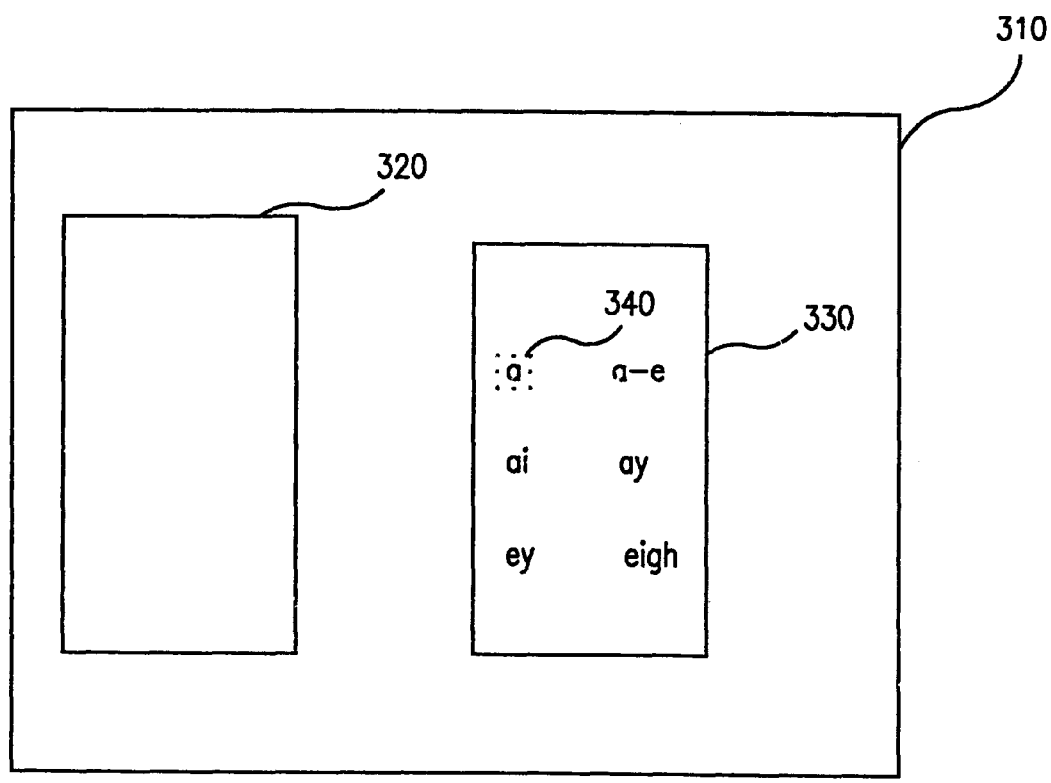
FIG. 3 illustrates a video or computer display while performing the sound procedure in accordance with the present invention.

When the sound procedure 10 is performed in the video or on the computer, as shown in FIG. 3, a list of different sounds are generated textually within a selected activity box 330 on a video screen or a computer display 310. FIG. 3 shows a plurality of activity boxes 320 and 330 in which words, sentences, directions still pictures or moving pictures can be placed. A highlighting cursor 340 moves to sounds and allows the student to immediately identify the word and relate the sound as it is demonstrated audibly by the video presentation or the computer. The highlighting cursor can be any mechanism that visually highlights a portion of the display to identify a portion of the display being audibly generated. The student learns to instantly recognize and pronounce the sounds, no matter in what position they may appear in a word. The video and/or computer can audibly generate via speaker, for example, the sound corresponding to the visually represented sound in correspondence to the location of the cursor 320.

In step 20 of the lesson process of FIG. 1, a drill procedure is performed. The drill procedure is designed to exercise a student's voice, sight, hearing and memory. These exercises are used in much the same way as a music student uses a practice exercise. Each lesson's drill procedure includes sounding out a selected sound while reading each spelling of the sound. Words which use each spelling of the sound being taught in the beginning, middle, or end of words are then read and used in both questions and answers.

In a classroom environment, the teacher writes the drill on a chalkboard, or the like. Each sound being taught in the lesson is written on the board. As each sound spelling is written on the board, the teacher states the sound aloud. The students are then required to repeat the sounds. This is repeated until all sounds have been written on the board. Additionally, different colored chalk is used to differentiate between consonants and vowels. Once all sounds are written, the teacher next blends each of the different sounds by pointing to the spelling of one sound, saying the sound then pointing to and saying the next sound. Next, a circular motion between the two sounds is made by the pointer while the teacher says the blended sounds. The teacher can also have students individually repeat the drill. The teacher can integrate the video into the procedure taught in the classroom.

Figure 4:
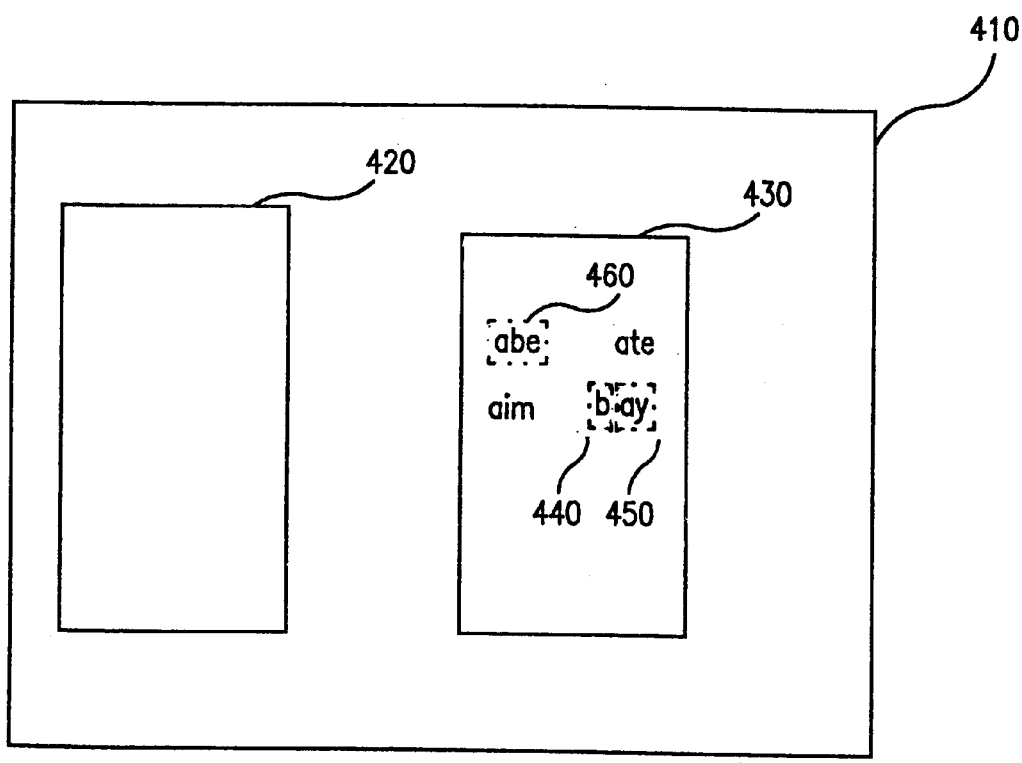
FIG. 4 illustrates a video or computer display while performing the drill procedure in accordance with the present invention.

In addition to or in place of a video presentation, the lessons can also be performed by interaction with a computer. On both the video and the computer illustrated in FIG. 4, the words are presented in both printing and cursive writing, and both capital letters and lower case letters within activity boxes 420 and 430. The present invention allows reading, writing, printing, speaking, listening, thinking, language structure, and context to be taught at the same time which provides an excellent learning experience. Also, when using the video or interactive computer, a highlighting cursor can be used to move to each sound and combination of sounds as the student pronounces the sounds. For example, as shown in FIG. 4, a list of different combinations of sounds is illustrated within a selected box 430 on a video screen and/or a computer screen 410. The combinations of sounds does not have to comprise a word. Highlighting cursor 440, 450 moves to each sound within the combination of sounds, and then to the entire combination as illustrated by highlighting cursor 460. As the cursor moves from sound to sound within the combination of sounds, the sound is audibly demonstrated through a speaker. Once all sounds of combination are audibly demonstrated, the pronunciation of the combination is demonstrated audibly.

If a video is being viewed, it can be used by the student to determine proper diction and pronunciation. The pronunciation of sounds within the video is performed within a timed sequence that students can attempt to emulate. As the student becomes better able to state the sounds, the student will be able to speak the sounds and combinations of sounds at the sequence speed of the video. Students practice until they can read and say the sounds and words at the same speed as demonstrated in the video, with no mistakes. The student is able to immediately identify the word and relate the sound and can instantly recognize and pronounce the sounds, no matter what position in which the sound may appear in a word.

To assist the student, each of the sounds of the word are then audibly produced via speaker, for example, where each sound of the word is depicted utilizing a cursor. Also, the sounds being learned can be put to a simple melody which will assist in memorization. It is noted that students of foreign origin can often sing a song in English without an accent, but cannot speak the same words without the accent. The present invention allows the use of a song or songs with enough verses to define all the sounds and all their spellings.

In step 30 of the lesson process of FIG. 1, students are able build their vocabulary and comprehension skills. An exemplary embodiment of the present invention uses words in questions, answers stories and to teach students what the words mean and how they are used. Pictures are used in a video, a computer and workbooks to reinforce meaning. Linking new words with words learned in previous lessons increases vocabulary, comprehension and the ability to use words effectively. Students are able to learn synonyms, antonyms, homonyms, compound words, prefixes and suffixes. Students sound out new words so they know how to pronounce them correctly.

In the classroom, an initial sound of a word is written on the board by the teacher. The students are asked to say the sound. A second sound spelling is then placed on the board and the students are asked to say the second sound. When the word is complete, a blending motion is made by the teacher with a pointer and the class is asked to state the entire word. Next, the students are asked to use the word in a sentence or the teacher can state a partial sentence and ask the students to finish the sentence. Eventually, the students will be able to say the sounds as they are written on the board and blend them when asked.

Once the students learn the words, the teacher can introduce the concepts of antonyms; a word having a meaning opposite to that of another word (e.g., wet and dry), synonyms; one of two or more words that have one or more meanings in common (e.g., understand and comprehend), homonyms; one of two or more words that have the same sound and same spelling but different meaning (e.g., butter), homographs; one of two or more words that have the same sound and the same spelling but differ in origin, meaning and sometimes pronunciation (e.g., bass), homophone; one of two or more words that are pronounced the same but differ in meaning, origin and sometimes spelling (e.g., night and knight) and compound words. The teacher can place a word on the board, ask the student if, for example, they know any words with the opposite meaning of the word on the board, then ask them to use it in a sentence.

Figure 5:
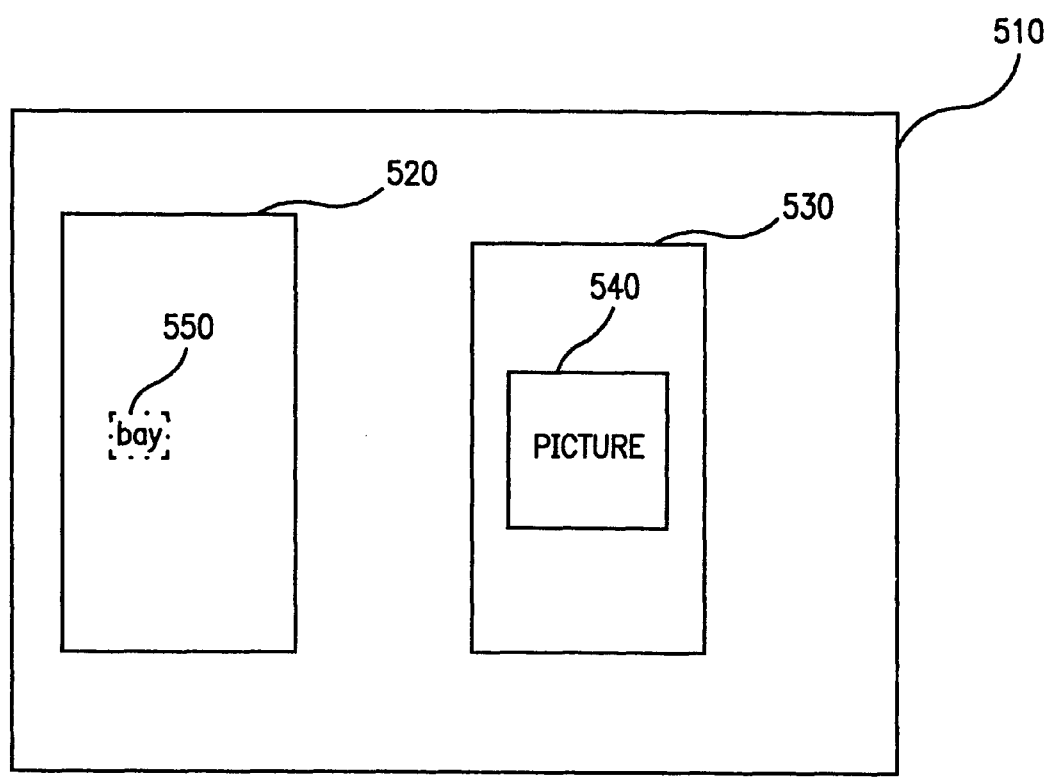
FIG. 5 illustrates a video or computer display while performing the words procedure and spelling procedure in accordance with the present invention.

FIG. 5 illustrates a picture 540 within activity box 530 shown in combination with a printed spelling of a word located in activity box 520 and a cursive spelling of the word. The highlighting cursor 550 is utilized in the video and the interactive computer display 510 to help students learn how the sounds blend with the words. As discussed with respect to FIG. 4, each sound of the combination of sounds (in this case a word that relates to a picture) is audibly demonstrated. Next the entire word is stated for the student to repeat. Students then read and write the words in their workbooks, so they know how to spell them. Also, students use the words learned in questions, answers and stories, to understand how they are used in context.

In step 40 of the FIG. 1 procedure, students learn verb tenses and how to use the proper tense for the time of an action. Illustrations of past, present and future actions provided by the teacher, video, computer and workbook lead students to an intuitive understanding of how to use verbs properly. Students perfect these skills by practicing the verb view exercises.

In the classroom environment the teacher writes on the board column headings (from left to right) consisting of Descriptive Verbs (Root Word), Present Tense, Past Tense, and Future Tense. A descriptive verb is a verb that simply describes an action, without indicating a time period. Descriptive verbs are tenseless. For example, "I walk to the bank once a week". Verbs of this type are defined as present tense verbs in generally accepted grammatically references; however, for the purposes of the present invention, it would be easier for the student to grasp the concept of past, present, and future if a descriptive verb is first displayed. The student could then apply a time period to the action specified in that verb. The descriptive verb is written on the board and sounded out with the students. The verb is then used in a sentence by either the teacher or a student. The present tense form of the verb is written in the present tense column. The verb is used in a sentence by the teacher or students. This procedure is repeated for both the Past Tense and Future Tense.

Figure 6:
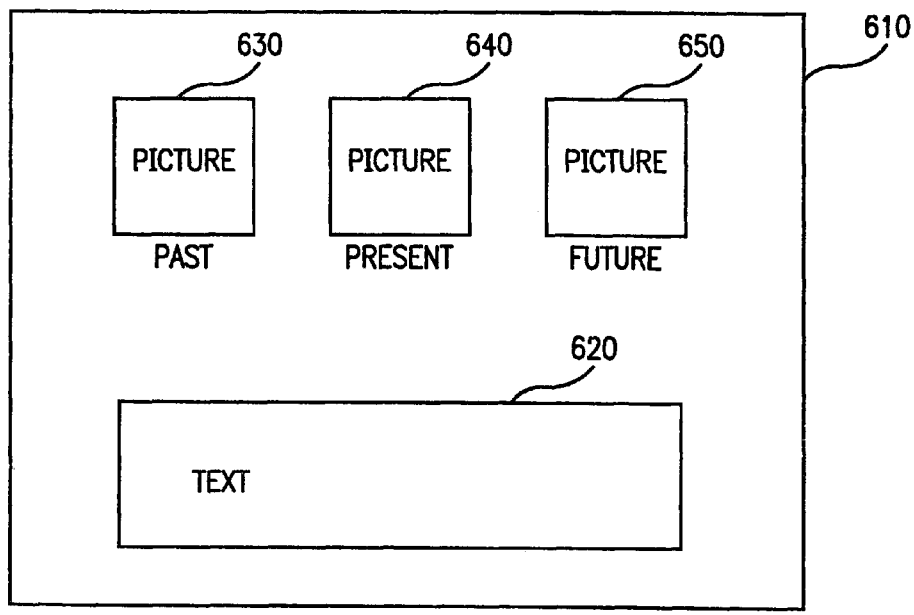
FIG. 6 illustrates a video or computer display while performing the verbs procedure in accordance with the present invention.

When the interactive computer system or video is employed, verbs are taught by showing a picture of a past, present, and future action and positioning the pictures on the screen in a consistent way. That is, as shown in FIG. 6, pictures 630 depicting past tense verbs appear on the left side of the screen 610, pictures 640 depicting present tense verbs appear in the center of the screen 610, and pictures 660 depicting future tense verbs appear on the right side of the screen 610. During the course of the lessons, the positions of the pictures and hence, the tenses can be altered to help the student reinforce the use of verbs. A sentence illustrating the verb tense is provided in activity box 620.

Questions are asked about the pictures in activity box 620, and students are asked to provide the answers orally and within the workbook. For example, "What did Robert do?", "What is Jane doing?" and "What will Peter do?" These questions teach the sounds, word meaning, and verb tense simultaneously.

In step 50 of the procedure shown in FIG. 1, sentences are built from the sounds that were built into words. The student is able to practice reading, writing and speaking in complete sentences. When constructing sentences, students learn to recognize and use words, their meaning, the way they sound, and the way they are spelled. In the early lessons, only simple questions and declarative sentences are used while in later lessons students use multi-syllable words and more complex sentences. Students also learn basic language patterns and usage naturally through questions and answers, the way all children learn from their parents and they develop conversational patterns used in everyday communication. This session stresses communication style.

Figure 7:
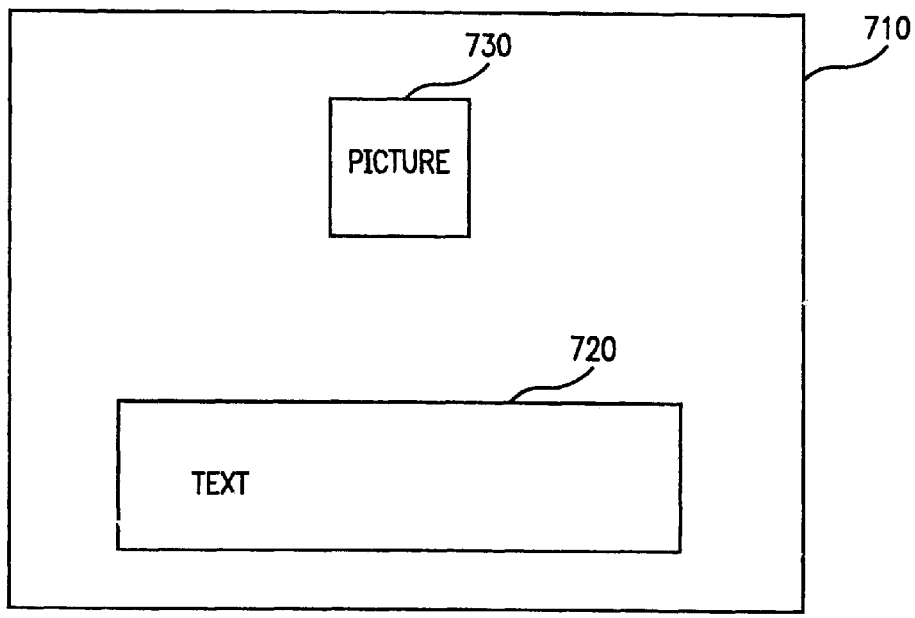
FIG. 7 illustrates a video or computer display while performing the sentence patterns procedure and language procedure in accordance with the present invention.

As illustrated in FIG. 7, a video or computer screen 710 is shown. In the box 730 in the upper half of the screen a picture is shown. In the lower activity box 720, a question is asked and the sentence pattern in response to the question is also shown. The students, besides visualizing and vocally stating the answer, handwrite answers in their workbooks.

In step 60 of FIG. 1, questions and answers are utilized to stimulate student's curiosity, reasoning and independent thought. The question words: "who", "what", "where", "when", "why", "which" and "how" are used in every lesson. Sometimes students ask the questions, sometimes they answer them. Students ask and answer questions in writing and verbally. Answering questions helps students learn to express their ideas and to convey information within their knowledge base. They are required to answer all questions using full sentences and complete thoughts. Students are also taught how to ask questions. Asking questions, and follow-on-questions, teaches students how to add to their knowledge base. Formulating good questions is also an important skill for critical thinking.

Following are some of the language concepts students learn through the question-and-answer approach:

The answer to a question posed "who?" establishes the difference between people (proper nouns like Robert and Roberta) and things (common nouns like pot and potato). An answer in response to the question "what?" identifies objects (common nouns) and their placement in a sentence, along with practicing and understanding the meaning of words such as this, that, these and those. Answers to the question "where?" provides practice in the use of placing prepositions such as in, on, at, to, of, under, above, below and so on. Answers to the question "when?" is the most difficult question for many students. "When?" is used throughout exemplary procedures employed by present invention to teach the idea of time and time relationships. Answers to the question "why?" is used to elicit an answer that includes an explanation or a reason for an action or condition. Understanding the reason something occurs is an important aspect of critical thinking. Answers to the question "which?" teaches comparisons which is another important aspect of critical thinking. Answers to the question "how?" stimulates analytical thought and helps students develop the ability to record, interpret and evaluate what they hear and read. The display as shown in FIG. 6 is utilized when this procedure is performed on a video or computer display. Within the upper activity box 630 a picture is shown while within the lower activity box 620 questions are asked along with the correct answer.

In the more advanced lessons, students begin to practice reading short stories and answering questions about the stories. For example, questions such as "who are the main characters?", "what is the major idea?", "where does the story occur?" and "when did it take place?" are asked. Students learn to identify and understand story ideas and themes and how to formulate a mental picture of what they read, and reproduce the information in speech and writing. Students are required to independently select, read and make written and oral reports on reading material appropriate for their grade level and maintain a log of their independent reading. Additionally, to aid in comprehension and to generate interest in current events, students read newspaper articles. The articles may be world, local or business news, sports or an editorial, depending on a student's age and interests. Students discuss the articles with classmates, parents, a tutor or sibling. The discussion includes identifying major ideas and supporting detail for each story.

Students are also taught to tell jokes. Jokes require a careful use of the language. Timing and emphasis are important to joke telling. Many jokes are language-based and require a subtle understanding of the sound and meaning of words. Joke telling adds an entertaining dimension to each lesson while teaching important language concepts. Jokes help students learn to think about context, denotation and connotation.

In step 70 illustrated in FIG. 1, students practice spelling all the words in each lesson. They learn that changing a single letter in a word changes it to a different word. That emphasizes the importance of spelling correctly. Linking writing to reading improves students' spelling skills. They read the word spelled correctly and reinforce their memory by writing it. When students see a new word in print, they mentally divide the word into its sound components and combine those components to sound out the word. They then translate the sounds into an appropriate spelling for each sound and then check to determine if the spelling is correct. When a student spells a word correctly the first time, the link between the sound of the word and its correct spelling is reinforced. If the word is spelled incorrectly, the student has either pronounced the word incorrectly, or applied the wrong spelling to the sound. In either case, by comparing their spelling with the correct spelling, students can correct any error quickly and reinforce the correct spelling.

In the classroom setting, the teacher dictates words from a provided list. The teacher then uses each word in a sentence and the word is repeated. The students are then required to write each word in the workbook. Additionally, the spelling procedure can be done vocally into the microphone of a computer, for example, or can be done manually by input via a keyboard or handwritten into a workbook. The display as shown in FIG. 5 is used when this procedure is performed in the video or on a computer display. In the left activity box 520 a word is spelled (letter-by-letter) while each individual letter is audibly stated. In the activity box 530 on the right of the screen 510, a picture 540 is shown.

In step 80 illustrated in FIG. 1, a writing procedure is illustrated. The students answer questions, make up questions and write original stories using complete sentences. Students use words from the current and previous lessons to write original short stories. The teacher assigns a subject or a choice of subjects for students to write about. The teacher can also establish the tone for the story (happy, true, imaginary, funny and so on) and whether the story should be written from the student' s point of view (first person) or from someone else's point of view (third person). Students are required to outline each story using the supplied words, subject, tone and person. They write the story using their own ideas, experiences and imagination. In an exemplary implementation of the present invention, workbooks have been designed to maximize the student's ability to write well. They are totally integrated with the video or computer lessons. Starting with the first lesson, students actively engage in the process of writing.

In step 90 of the FIG. 1 illustration, once a lesson is finished, a test can be taken by the student to ensure the teachings of the lesson have been reinforced. Multiple-choice questions, that can be answered with an "x" or "o", or any other questions that have abbreviated answers for machine scoring are used only to teach students how to answer such questions on standardized tests. The tests presented do not use multiple choice questions, "x" and "o" answers, or any other abbreviated answer forms, because they are not useful in training students to think and to use full sentences. The tests presented in accordance with an embodiment of the present invention require students to organize their thoughts, structure their answer in their mind, and then write them, using complete sentences. At the end of each lesson, students take a reinforcement test to move what they have learned to their long-term memory and to provide students and teachers a means for evaluating progress. In accordance with an exemplary embodiment of the present invention, based upon the students performance on the test, it is determined whether each student passed or failed. If the student failed the test, it is further able to be determined which procedure the student must be returned to in order to repeat the needed procedures. For example, if it is determined that the student does not understand verbs from the answers given in the test, the student is returned to sequentially repeat the procedures starting from the verb procedure. Each time a student takes, a test the questions asked are changed so that the student may not merely memorize the answer. If the test is performed through the use of a computer, the test can be randomly generated by the computer.

The students are also allowed to correct their own exercises and tests. Self-correction is an important part of the program. Students correct their own work by comparing it with what is shown on the video. Self-correction is an important reinforcement technique. It also helps students develop both observation and comparison skills.

Figure 8:
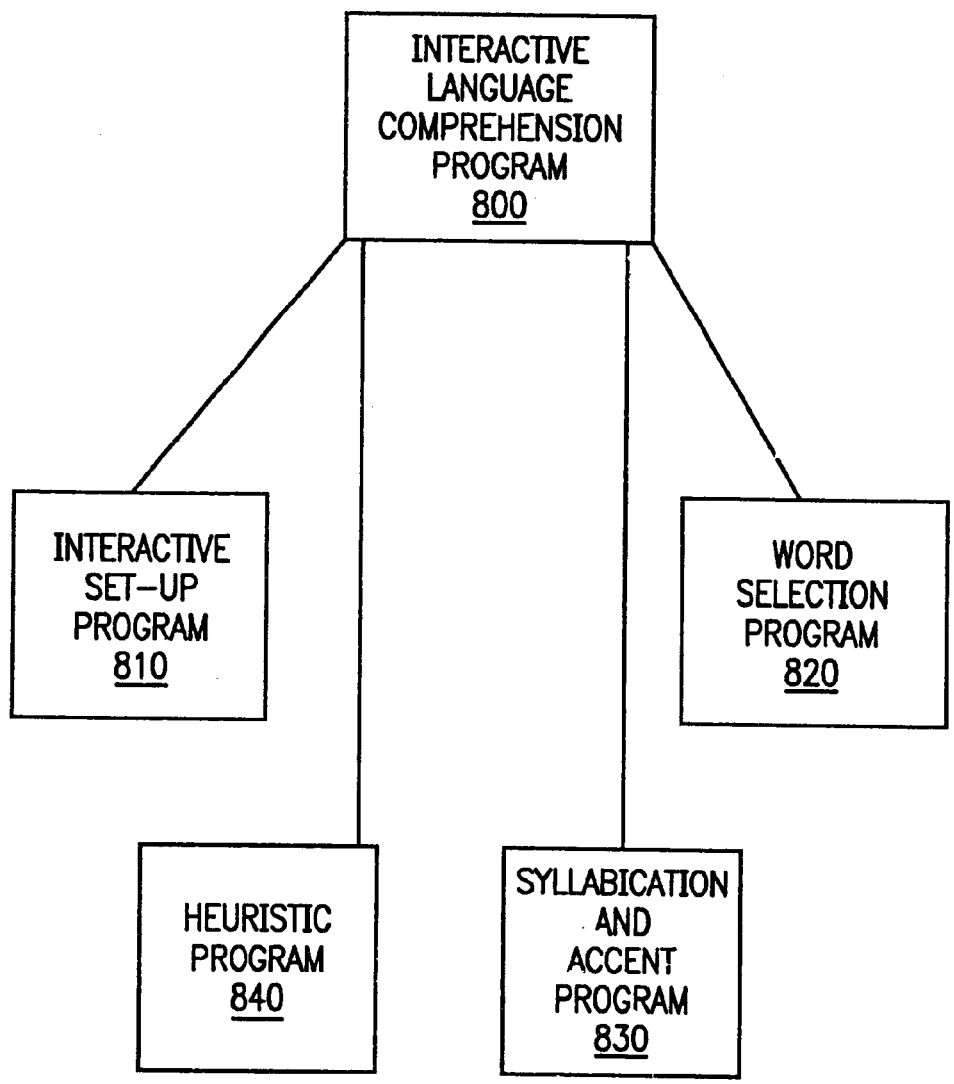
FIG. 8 illustrates general block diagram showing the sub-programs of the interactive language comprehension program in accordance with the present invention.
Figure 9:
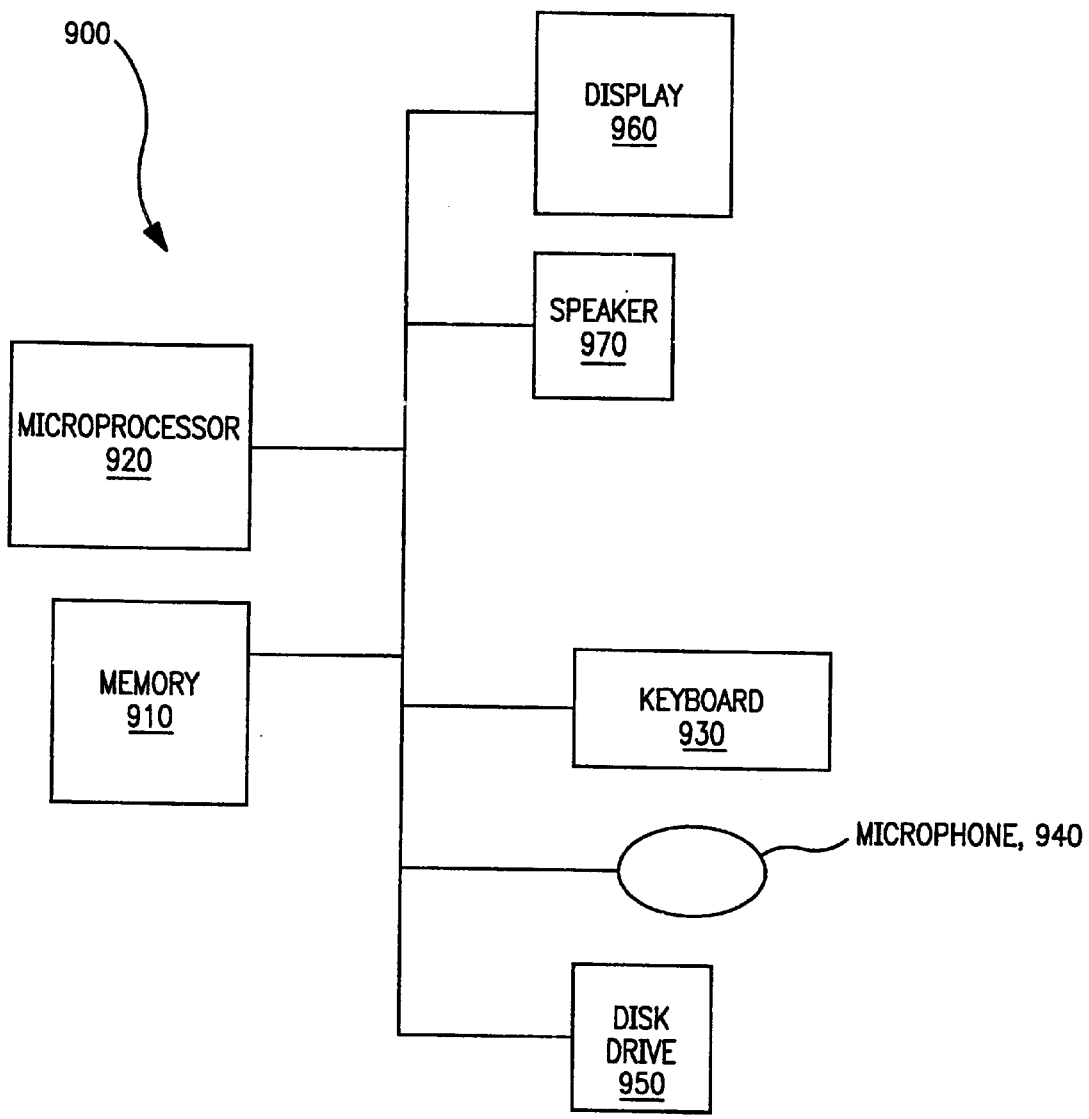
FIG. 9 illustrates a general block diagram showing a computer used in accordance with the present invention.

In FIG. 8, various parts of an exemplary interactive computer program are shown in a block diagram. The FIG. 1 process can be implemented as the Interactive Language Comprehension program 800 illustrated in FIG. 8. As illustrated in FIG. 9, the Interactive Language Comprehension program can be placed into a memory 910 of a general computer 900 and run through the use of a processor 920. The computer comprises input means such as a keyboard 930, microphone 940, disk drive 950 and so forth. Additionally, the computer comprises a display screen 960 and a speaker output 970. There are several sub-programs that can be stored in the computer memory 910 and implemented with the interactive language comprehension program 800.

First, there is the interactive set-up program 810 which provides students with the ability to interactively communicate and provide vital information to computer. Information such as age, sex, school grade, mother tongue, other languages spoke, activities of interest, and so forth are input into the computer 800. This is done so the Interactive Language Comprehension program 800 will customize itself to the students needs. For example, the words and ideas taught to a 7 year old female student, will be different from those used for a 25 year old man working for a corporation. In the case of the employee, differentiations can be made by job classification, or other characteristics. For example, the knowledge that a corporation is utilizing the program allows for the program to be altered to use words that are common for that particular company and industry.

For the initial student set-up, voice recognition and bio-feedback techniques can be employed. The student will be asked to repeat a series of sounds and words. Those sounds and words will be recorded in the computer. The frequency, tone, pitch, and other characteristics of the student's own voice can be determined using conventional voice recognition software, and recorded with respect to the user.

This can be utilized by the FIG. 9 computer 900 to provide additional feedback of a student's vocal progress in any of the procedures described with respect to FIG. 1, for example. Also, a simplified picture of the oscilloscope pattern for each sound, word and/or sentence can be displayed on the screen along with a picture of the word, spelling of each sound, and positioning of the tense. When the student speaks a sound or word, a similar simplified picture of the oscilloscope pattern of the student's voice will be shown. The computer 900 can ask questions and listen for correct answers. If the student mispronounces a word or uses the wrong tense in the answer, the computer will correct the student. The computer 900 can also teach the songs which help the memory of a student.

In an additional feature of the voice recognition routine, when a student speaks a word or sound, the computer 900 in addition to recognizing the voice, attempts to emulate certain voice characteristics. For example, if a student has a high-pitched or low-pitched voice, then the computer when stating words or asking questions to the student, will pronounce the word or sentence in the same type of voice that the student has. Once the student's voice is emulated, entire lessons can be run with the computer emulated voice, allowing the student to be more comfortable while learning.

In addition to the set-up program 810, a word selection program 820 is provided for selecting words to be used in a lesson. There are at least 3 versions of this program: a publisher version, a teacher version and a student version. Within the word program, words can be selected from, for example, an existing database, for inclusion in a particular lesson based on defined criteria.

Queries can be made to the computer by either keyboard 930 or speech via a microphone 940. When selecting word to be used within a lesson it can be based on, for example, being among the 10,000 most used words in the English language, being among the words having the sound being taught in the lesson, and being among other sounds in the words taught in previous lessons. For example, when a basic sound is entered, all the words having the same sound can be displayed on the display 960. Additionally, all the meanings with words of the same spelling are displayed on display 860.

The FIG. 8 word selection program 820 can also be used to display words selected. The cursor can be synchronized with the pronunciation of the word as previously described. The definition of the selected word is also displayed and the word is displayed in a sentence.

There is also a syllabication and accent program 830 that can be run in any of the procedures discussed with respect to FIG. 1. This program displays sounds of words and words (including words within sentences) using colored type or backgrounds and text treatment to show syllabication and word accent. There can be least 2 colors or 2 shades of gray and one special type treatment such as bolding or italicizing letter(s) to denote different syllables of words. For example, if a word contains three syllables, two syllables of the word could have a different colored background while the third syllable could have a bolded text. At the same time, the word is displayed, the sound of the word can be audibly provided. In addition, this syllabication can also be applied to words illustrated in the workbook.

There is also a heuristic program 840 which links test scores to future content by calculating student overall grades based on scores for homework, exercises and tests. The table provided below illustrates 11 typical categories of scoring the homework, exercises and tests. Each of the categories may have a different weighting value. The weighting values can change on the basis of the subject currently being taught. For example, capitalization will have a lower relative weight prior to teaching students when to use capital letters than afterward. Additionally, sentence structure, for example, might have been the subject area stressed for a particular assignment. Accordingly, the student's performance with respect to sentence structure would be weighted more. In the example shown in the following table, grades are on a 5-point basis.

|    |                     | Weight | E = 1 | D = 2 | C = 3 | B = 4 | A = 5 | Score    |
|----|---------------------|--------|-------|-------|-------|-------|-------|----------|
| 1  | vocabulary          | 15     |       |       | X     |       |       | 45       |
| 2  | punctuation         | 20     |       | X     |       |       |       | 40       |
| 3  | capitalization      | 10     |       | x     |       |       |       | 20       |
| 4  | spelling            | 15     |       |       |       |       | X     | 75       |
| 5  | Verb tenses         | 25     |       |       |       | X     |       | 100      |
| 6  | contractions        | 20     |       |       |       |       | X     | 100      |
| 7  | pronouns            | 10     |       |       |       | X     |       | 40       |
| 8  | sentence structure  | 15     |       |       |       | X     |       | 60       |
| 9  | thoughtful          | 25     |       |       | X     |       |       | 75       |
| 10 | creativity          | 5      |       |       |       |       | X     | 25       |
| 11 | Assignment complete | 30     |       |       |       |       | X     | 150      |
|    | TOTAL               | 190    |       |       |       |       |       | 730/190 = |

The words selected above can be sorted by one or more of any of the following predetermined criteria: number of syllables, synonyms and other words with similar meaning, antonyms and other words with opposing meaning, homographs, homophones, rhyming words (any syllable sound the same), prefixes, suffixes, plurals, verb tenses, classifications, compound words, Latin based words, Greek based words, Anglo-Saxon based words, all derivations of any root word, any letter or group of letters appearing anywhere in a word, any spelling of any sound anywhere in a word, any definition, enter any sound spelling of a word and get the correct spelling of the word, and any typically mispronounced words, and most popular to least popular words.

By breaking the scores down to the components of the English language (or other subject), teachers can more easily identify the specific components that are easier or more difficult for particular students. This information will lead to changes in emphasis or course content to assist students overcome barriers to learning. The program can slow down for specific areas of difficulty while continuing at a regular or speedier pace for those areas where students excel.

When the heuristic program 840 is utilized, a pre-test is administered to provide teachers and program developers with a defined starting point for the student. Each of the language skills is tested. Similar tests are taken at regular intervals during the course and at the end of the program.

These tests form the basis of measuring the student's improvement and the learning curve. During the initial set-up period students are taught using a different emphasis on visual, auditory, tactile and kinetic learning modes. Scores during these periods help in analyzing how information and learning modes should be coordinated for particular students.

Once a pattern is recognized the course uses the methods best suited to each student. For example, if it is determined that an entire class is performing below expectations, the teacher could be advised and provided with additional teaching tips to allow for better student understanding and an improvement in scoring. Also, if it is determined that one or two students are performing below expectations, certain activities or exercises can be designed for those students. In addition, the testing routine can also use the scores to change the schedule or sequence of material presented to the student.

Additionally, in another exemplary embodiment of the invention, a self-correction routine is employed. For example, in a sentence lifting procedure, the teacher writes a selected sentence on a board. Next either the teacher or the student reads the sentence as written. The student is next required to identify the mistake or mistakes in the sentence. Once the mistake is identified, the teacher or student draws a line through the error and makes the correction. Once all mistakes have been identified and corrected, the correct sentence is read in unison. Finally, all students are required to write the correct sentence.

Also, students correct their own work in several different ways. They correct their own papers as well as papers of other students. Teachers then review the student scoring to determine if the score is accurate. The scorer is thus tested in their understanding of what makes a good sentence, story or answer. The student learns to become a better scorer and thus improves their skills. This has several advantages including reducing the amount of grading that a teacher has to perform. The teacher, if students are grading properly, need only spot check to see if the grading has been performed correctly (i.e., the students show no favoritism).

All lessons, each of which teach some of the sounds of the English language can be completed in one school year or less. Older students and adults, including ESL students, can complete the program in even less time. Teachers, parents or others assisting students need no previous knowledge of phonics. The procedure can be used to teach English to preschool and school aged children and to adults. A kindergarten program can be tailored to typical school kindergartens and in preschool settings (e.g., using simple words and sentences familiar to small children). A separate program can be tailored to provide for older students who have not had previous training with the kindergarten program (e.g., using more complex word and phrases), while a more advanced program can be provided for students who have had previous training.

An adult program can be used to teach English as a second language to older children and adults and can be customized for corporations and other organizations that wish to teach employees' job related vocabularies. Additionally, a foreign program can be tailored to teach English in foreign countries to people not familiar with the language.

Utilizing the procedure outlined above, students learn to read, write, speak, listen and think well above current grade level standards. The present invention can help students transition from their native language to English. A student's fluency in English will help them throughout their lives. Student's grades in all subjects will improve, as well as their attitude and self-confidence. The lessons students learn about the English language will even help them learn other languages. The present invention allows students learn to move from one form of expression to another. They can read a story, write about it and talk about it. Each form of expression reinforces the others, so learning occurs more quickly. Students remain more interested, feel more confident and are more successful.

The present invention teaches students everything they need for a strong foundation in the English language. It is an asset that will serve them for a lifetime. Most students already have a surprisingly large English vocabulary learned from their parents, watching TV, listening to music, and conversing with adults and children. While a student may "know" how to say a word, and even have a good idea of what it means, that doesn't mean he or she can read, write or use the word effectively. The present invention makes it easy for students to make the connection between hearing, speaking, reading and writing.

It will be appreciated by those skilled in the art that the present invention can be embodied in other specific forms without departing from the spirit or essential characteristics thereof. For example, while the embodiments discussed above employed sounds, words and sentences of the English language, other languages and subject matter could also be taught. The presently disclosed embodiments are therefore considered in all respects illustrative and not restricted. The scope of the invention is indicated by the appended claims rather than the foregoing description and all changes that come within the meaning and range and equivalence thereof are intended to be embraced within.

What is claimed is:

1. A system for representing, generating and recognizing sounds, said system comprising:
    at least one presenting means for presenting a plurality of individual sounds that have been combined into a sound combination representing a collective sound, each of said individual sounds being visually represented by text; and
    at least one sound generating means for audibly producing a sound corresponding to each visually represented individual sound, wherein each individual sound in the sound combination is audibly produced as the individual sound is pronounced in the sound combination and is depicted visually using a highlighting cursor.

2. The system of claim 1, wherein said highlighting cursor highlights sounds using a colored type or a colored background.

3. The system of claim 1, wherein said highlighting cursor provides a different color or text treatment for each sound.

4. The system of claim 1, wherein said sound combination is a word.

5. The system of claim 4, wherein said highlighting cursor highlights said at least one sound within said word using a colored type or a colored background.

6. The system of claim 4, wherein said highlighting cursor provides a different color or text treatment for each of said at least one sound within said word.

7. The system of claim 1, wherein the sound generating means audibly produces each sound in the sound combination individually, and then audibly produces the sounds of the sound combination collectively.

8. The system of claim 7, wherein each individual sound in the sound combination is audibly produced according to a timed sequence.

9. The system of claim 1, wherein said the at least one presenting means presents at least two different sound combinations, each of said sound combinations including at least one of said individual sounds at a different location to form two different collective sounds.

10. The system of claim 1, wherein each individual sound in said sound combination is audibly produced by the at least one sound generating means when depicted visually using said highlighting cursor.

11. The system of claim 1, wherein at least one of the plurality of individual sounds is visually represented by non-contiguous text symbols.

12. The system of claim 7, wherein the at least one presenting means displays a visual representation of the sound combination.

13. The system of claim 7, wherein the sound combination constitutes a blending of the individual sounds.

14. A computer implemented method for increasing language comprehension, said method comprising the steps of:

displaying textually at least one sound to be viewed;

highlighting the text representing said at least one sound;

displaying said at least one sound textually within a combination of sounds which represent a collective sound;

highlighting each sound within said combination of sounds; and audibly stating said at least one sound as pronounced in said combination of sounds via computer generated audio while the text representing said at least one sound is highlighted.

15. The computer implemented method of claim 14, comprising the step of:

audibly stating each sound of said combination of sounds as each sound is pronounced in said combination of sounds via computer generated audio while each sound of said combination of sounds is highlighted.

16. The computer implemented method of claim 15, wherein said computer generated audio is emulated to be similar to the voice of a particular user.

17. The method of claim 14, further comprising the steps of:

placing said sounds into combination of sounds which are verbs; and displaying sentences comprising said verbs and combination of sounds.

18. The method of claim 17, further comprising:

displaying a picture describing said verb wherein the location of the picture is indicative of the tense of the verb.

19. The method of claim 14, wherein said combination of sounds is a word.

20. The method of claim 19, wherein the step of displaying further comprises the step of presenting an associated picture described by said word.

* * * * *